United States Patent
Yoda et al.

(10) Patent No.: US 7,371,320 B2
(45) Date of Patent: May 13, 2008

(54) MAGNETIC SEPARATION UNIT AND WATER PURIFICATION SYSTEM

(75) Inventors: Hiroaki Yoda, Tsuchiura (JP); Satoshi Yumoto, Yuki (JP); Minoru Morita, Abiko (JP)

(73) Assignees: Hitachi Plant Technologies, Ltd., Tokyo (JP); T-Tec Co., Ltd., Tokyo (JP)

( * ) Notice: Subject to any disclaimer, the term of this patent is extended or adjusted under 35 U.S.C. 154(b) by 529 days.

(21) Appl. No.: 11/008,193

(22) Filed: Dec. 10, 2004

(65) Prior Publication Data

US 2005/0126976 A1    Jun. 16, 2005

(30) Foreign Application Priority Data

Dec. 11, 2003   (JP)   .............................. 2003-412706

(51) Int. Cl.
*C02F 1/48* (2006.01)
(52) U.S. Cl. ...................... 210/202; 210/206; 210/223; 210/259; 210/391
(58) Field of Classification Search ................ 210/202, 210/206, 223, 259, 391
See application file for complete search history.

(56) References Cited

FOREIGN PATENT DOCUMENTS

| | | |
|---|---|---|
| JP | 2001-96188 | 4/2001 |
| JP | 2002-119887 | 4/2002 |

OTHER PUBLICATIONS

Machine Translation of JP 2001-096188, A, speicifcation and claims.*
Machine Translation of JP 2002-119887, A, specification and claims.*

* cited by examiner

*Primary Examiner*—David A Reifsnyder
(74) *Attorney, Agent, or Firm*—Crowell & Moring LLP

(57) ABSTRACT

A magnetic separation unit can prevent any magnetic flocs deposited on an inner wall of a water passing pipe from closing a water channel for stabilizing a magnetic separation performance and reduce cost by a small-diameter portion of the water passing pipe. The magnetic separation unit has an air-core solenoid type magnet provided around the water passing pipe guiding, from a lower side, treated water including magnetic flocs in which contaminants and magnetic particles are flocculated, a rotating disc type magnetic filter case provided above the air-core solenoid type magnet for attracting the magnetic flocs in the treated water supplied from the water passing pipe and flushing means for flushing the matrixes to which the magnetic flocs are attracted. The water passing pipe has a small-diameter pipe positioned in the air-core solenoid type magnet, and an enlarged pipe enlarged from the small-diameter pipe toward a water passing part of the rotating disc type magnetic filter case.

10 Claims, 4 Drawing Sheets

MAGNETIC SEPARATION UNIT AND WATER PURIFICATION SYSTEM

CLAIM OF PRIORITY

The present application claims priority from Japanese application serial JP 2003-412706 filed on Dec. 11, 2003, the content of which is hereby incorporated by reference into this application.

BACKGROUND OF THE INVENTION

1. Field of the Invention

The present invention relates to a magnetic separation unit and a water purification system. In particular, the present invention is preferable for a magnetic separation unit and a water purification system which purify treated water including magnetic flocs in which contaminants and magnetic particles are flocculated by magnetic separation.

2. Description of Related Art

A prior art magnetic separation unit and water purification system are described in Japanese Published Unexamined Patent Application No. 2001-96188 (Patent Document 1).

The water purification system of Patent Document 1 has a water intake unit taking in raw water including contaminate components, an additive injection unit injecting a coagulant agent and magnetic particles into the raw water taken in by the water intake unit, a floc forming unit forming magnetic flocs in which the contaminants and the magnetic particles are flocculated by the injection of the coagulant agent and the magnetic particles, a magnetic separation unit separating the magnetic flocs from the raw water including the magnetic flocs, and a purified water discharging unit discharging as purified water the raw water from which the magnetic flocs are removed.

The magnetic separation unit has an air-core solenoid type magnet as a superconducting magnet provided around a water passing pipe guiding from the lower side treated water including magnetic flocs in which contaminants and magnetic particles are flocculated, a rotating disc type magnetic filter attracting the magnetic flocs in the treated water fed from the water passing pipe provided above the air-core solenoid type magnet, and flushing means for flushing the magnetic flocs attracted by the rotating disc type magnetic filter. The pipe diameter of the water passing pipe is the same from the portion positioned in the air-core solenoid type magnet to the water passing part of the rotating disc type magnetic filter.

Such magnetic separation unit enables continuous treatment without stopping the treated water since the magnetic flocs are attracted by the rotating disc type magnetic filter arranged on the upper side of the air-core solenoid type magnet. Using the superconducting magnet as a magnet can save energy. The magnetic field gradient around a magnetic wire is increased to realize high-speed purification.

[Patent Document 1] Japanese Published Unexamined Patent Application No. 2001-96188.

SUMMARY OF THE INVENTION

When rotating the rotating disc type magnetic filter to continuously perform high gradient magnetic separation in the magnetic separation unit of Patent Document 1, the magnetic gradient of the rotating disc type magnetic filter must be set as high as possible for high-speed treatment. The magnetic force of the air-core solenoid type magnet is set so that the magnetic gradient of the magnetic filter part having magnetic thin wires is extremely high (approximately $10^3$ T/M). The high range of the magnetic gradient is limited to several mm around the thin wires. To efficiently perform magnetic separation, the thin wires are stacked tightly in space to construct the magnetic filter part. The flow velocity of treated water passing through the magnetic filter part must be lowered.

The pipe diameter of the water passing pipe is the same from the portion positioned in the air-core solenoid type magnet to the water passing part of the rotating disc type magnetic filter. When lowering the flow velocity of treated water passing through the magnetic filter part, the treated water passing through the air-core solenoid type magnet is slow. The air-core solenoid type magnet has the highest magnetic field strength near the center in the axial direction. When the magnetic flocs in the treated water pass through the portion, they are continuously subject to the magnetic force to curve its trajectory and may be trapped on the inner wall of the water passing pipe. When the magnetic flocs are trapped on the inner wall of the water passing pipe, the water passing part can be shrinked to lower the magnetic separation performance.

An object of the present invention is to provide a magnetic separation unit and a water purification system which can prevent any magnetic flocs deposited on the inner wall of a water passing pipe from closing a water channel for stabilizing the magnetic separation performance and reduce the cost by the small-diameter portion of the water passing pipe.

To achieve the above object, the present invention is a magnetic separation unit including an air-core solenoid type magnet provided around a water passing pipe guiding, from a lower side, treated water including magnetic flocs in which contaminants and magnetic particles are flocculated, a rotating disc type magnetic filter provided above the air-core solenoid type magnet for attracting the magnetic flocs in the treated water supplied from the water passing pipe and flushing means for flushing matrixes to which the magnetic flocs are attracted, wherein the water passing pipe has a small-diameter pipe positioned in the air-core solenoid type magnet, and an enlarged pipe enlarged from the small-diameter pipe toward a water passing part of the rotating disc type magnetic filter.

More preferably, the present invention has the following construction.

(1) The enlarged pipe of the water passing pipe is enlarged from the upper portion in the air-core solenoid type magnet.

(2) The air-core solenoid type magnet is constructed by a superconducting magnet provided in a vacuum insulation case.

(3) A flow rectification unit is arranged in the enlarged pipe of the water passing pipe.

(4) The flow rectification unit is provided with a baffle conically enlarged along the center axis in the enlarged portion in which the cross-sectional area of the enlarged pipe of the water passing pipe is enlarged.

(5) The flow velocity of the small-diameter pipe of the water passing pipe in the air-core solenoid type magnet is set in the range from 0.2 to 1.0 m/s.

(6) The flow velocity of the water passing part of the rotating disc type magnetic filter to which water is passed from the enlarged pipe of the water passing pipe is set to about 0.1 m/s.

To achieve the above object, the present invention is a water purification system which has a water intake unit taking in raw water including contaminate components, an additive injection unit injecting a coagulant agent and magnetic particles into the raw water taken in by the water intake unit, a floc forming unit forming magnetic flocs in which the contaminants and the magnetic particles are flocculated by the injection of the coagulant agent and the magnetic particles, a magnetic separation unit separating the magnetic flocs from the raw water including the magnetic flocs, and a purified water discharging unit discharging as purified water the raw water from which the magnetic flocs are removed, wherein the magnetic separation unit has an air-core solenoid type magnet provided around a water passing pipe guiding, from a lower side, treated water including magnetic flocs in which contaminants and magnetic particles are flocculated, a rotating disc type magnetic filter provided above the air-core solenoid type magnet for attracting the magnetic flocs in the treated water fed from the water passing pipe and flushing means for flushing matrixes to which the magnetic flocs are attracted, wherein the water passing pipe has a small-diameter pipe positioned in the air-core solenoid type magnet, and an enlarged pipe enlarged from the small-diameter pipe toward a water passing part of the rotating disc type magnetic filter.

More preferably, the present invention has the following construction.

(1) A flow rectification unit is provided with a baffle conically enlarged along the center axis in the enlarged portion in which the cross-sectional area of the enlarged pipe of the water passing pipe is enlarged.

(2) The flow velocity of the small-diameter pipe of the water passing pipe in the air-core solenoid type magnet is set in the range from 0.2 to 1.0 m/s. The flow velocity of the water passing part of the rotating disc type magnetic filter to which water is passed from the enlarged pipe of the water passing pipe is set to about 0.1 m/s.

According to the magnetic separation unit and the water purification system of the present invention, the water passing pipe guiding, from the lower side, treated water including flocculates in which contaminants and magnetic particles are flocculated has the small-diameter pipe positioned in the air-core solenoid type magnet, and the enlarged pipe enlarged from the small-diameter pipe to the water passing part side of the rotating disc type magnetic filter. It is possible to prevent any magnetic flocs deposited on the inner wall of the water passing pipe from closing a water channel for stabilizing the magnetic separation performance and reduce the cost by the small-diameter portion of the water passing pipe.

DESCRIPTION OF THE PREFERRED EMBODIMENTS

Figure 1:
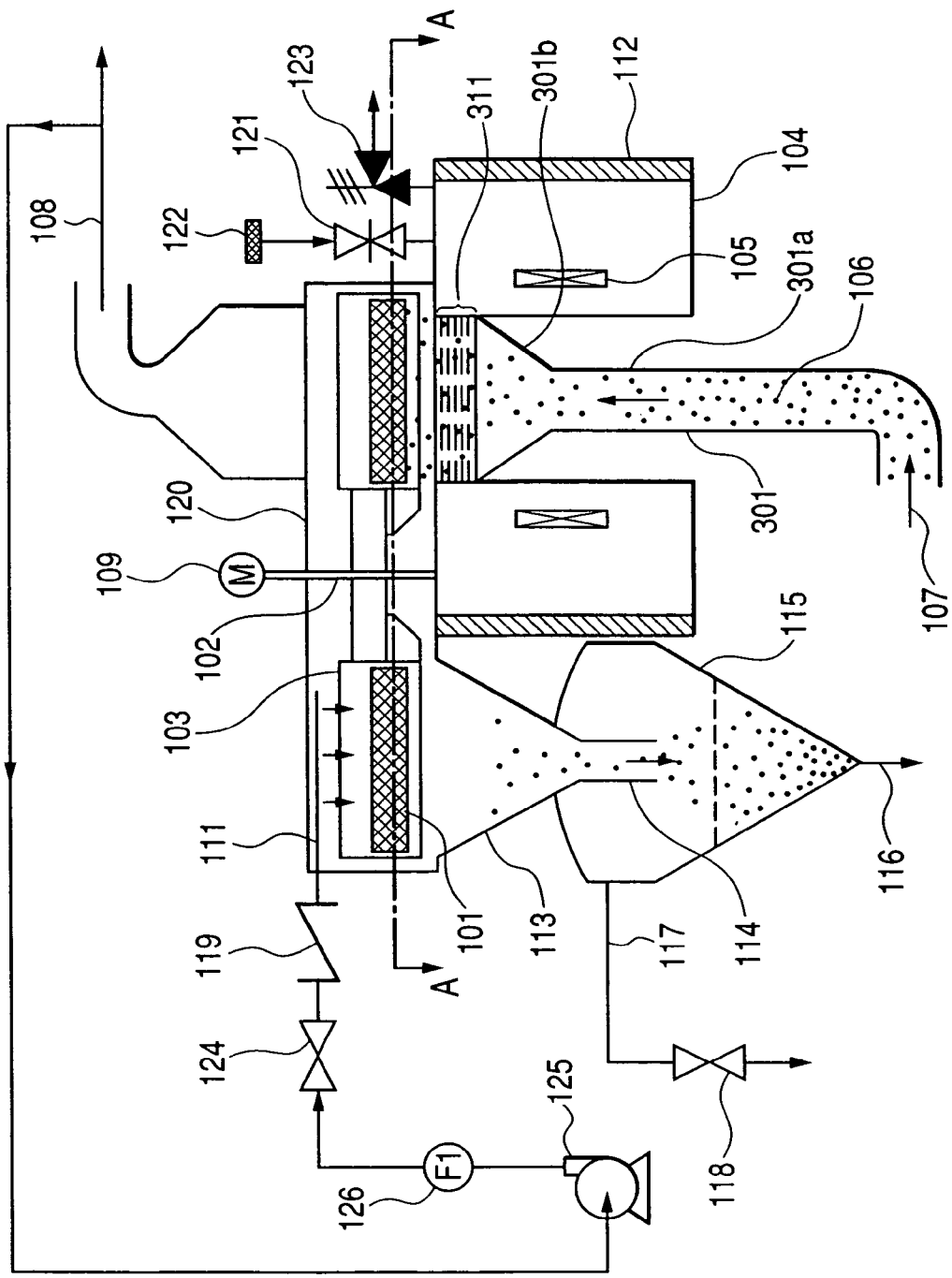
FIG. 1 is a block diagram showing a magnetic separation unit of a first embodiment of the present invention.

A plurality of embodiments of the present invention will be described below using the drawings. The same reference numerals in the drawings of the embodiments denote similar things or equivalent things.

A magnetic separation unit of a first embodiment of the present invention will be described using FIGS. 1 and 2.

FIG. 1 is a block diagram showing the magnetic separation unit of the first embodiment of the present invention. FIG. 2 is a cross-sectional view taken along line A-A of FIG. 1.

As shown in FIG. 1, the magnetic separation unit is constructed such that a rotating disc type magnetic filter case 103 fitted with matrixes 101 made of ferromagnetic substances and rotated on a center axis 102 to permit continuous treatment is arranged on the upper side extension of the air-core axis of a liquid helium cooling type superconducting magnet 105 stored in a vacuum insulation case 104. The cooling type superconducting magnet 105 is constructed by an air-core solenoid type magnet. As shown in FIG. 2, the donut-like matrixes 101 are fitted in the rotating disc type magnetic filter case 103.

The rotating disc type magnetic filter case 103 is arranged on the upper side of the superconducting magnet 105. The magnetic absorption of the matrixes 101 by the superconducting magnet 105 is balanced with its own weight of the superconducting magnet 105. This can reduce supporting force applied to the support construction, not shown, of the superconducting magnet 105 provided in the vacuum insulation case 104. The support construction of the superconducting magnet 105 in the vacuum insulation case 104 is simplified. The initial cost of the superconducting magnet 105 can be reduced. The superconducting magnet 105 can generate a high magnetic field above the saturation magnetic flux density of magnetic particles in magnetic flocculates, which inflow into the matrixes 101 part of the rotating disc type magnetic filter case 103 arranged on the upper side extension of its air-core axis. Meshed magnetic substances capable of securing a high gradient magnetic field are used as the matrixes 101. This permits magnetic separation in the amount of injected magnetic particles at a low concentration (for instance, 5 to 10% of the sludge concentration of treated water). The running cost can be reduced. The superconducting magnet 105 is connected to a power source and a persistent current switch, not shown. The operation in the persistent current mode can reduce the running cost.

The operation of the magnetic separation of this embodiment is as follows. Treated water 106 including magnetic flocs generated in pretreatment is flowed at a high flow velocity of about 0.2 to 1.0 m/s from a lower side 107 into a small-diameter pipe 301a of a water passing pipe 301 passing in the air core of the superconducting magnet 105 to be flowed upward. The treated water 106 decreases the flow velocity by an enlarged pipe 301b from near the center portion of the inside of the air core. The treated water 106 is straightened by a flow rectification unit 311 having stacked non-magnetic thin wires arranged directly before the magnetic filter. The treated water 106 is flowed into the rotating disc type magnetic filter case 103 at a flow velocity of about 0.1 m/s. The magnetic flocs in the treated water 106 are attracted by the matrixes 101 upon passage through the matrixes 101 fitted in the rotating disc type magnetic filter case 103 to flow purified water from a purified water outlet 108.

The rotating disc type magnetic filter case 103 fitted with the matrixes 101 which has attracted the magnetic flocs is subject to the driving force of an electric motor 109 connected to the power source to be rotated on the center axis 102. The matrixes 101 which have attracted the magnetic flocs on the side of a water passing pipe 301 are rotationally moved to the flushing part on the opposite side of the water passing pipe 110 side. The flushing part sprays the purified water from a water spraying pipe 111 arranged on the upper side of the rotating disc type magnetic filter case 103 to remove particles such as the magnetic flocs adhered onto the matrixes 101. The water spraying pipe 111 constructs flushing means. The magnetic field strength of the flushing part is reduced by an iron shield 112 provided in the outer circumference of the vacuum insulation case 104. The particles such as the magnetic flocs adhered onto the matrixes 101 can be easily removed. The construction of the matrixes 101 is a construction such that meshed magnetic stainless steel is stacked vertically, horizontally, slantly, concentrically, or in a combination of these, to make it possible to secure a high gradient magnetic field. The generated magnetic field of the superconducting magnet 105 is a magnetic field above the saturation magnetic flux density (about 0.5 T) of the magnetic particles in magnetic flocculates existing or rapped in the matrixes 101 part arranged on the air-core axis extension of the superconducting magnet 105 to make it possible to provide a high gradient magnetic separation unit.

The particles separated from the matrixes 101 in the flushing part are collected by a sludge collecting case 113 on the lower side of the flushing part and are flowed through a sludge conveying pipe 114 down to a thickener 115. The thickened sludge is drawn from a sludge drawing port 116.

The magnetic separation matrixes 101 are arranged in the upper portion of the vacuum insulation case 104. The sludge collecting case 113 and the thickener 115 can be arranged in substantially parallel with the vacuum insulation case 104. As compared with the case of arranging the rotating disc type magnetic filter case 103 on the lower side of the superconducting magnet 105, the thickener 115 can be high without increasing the height of the entire unit. The sludge concentration can be higher.

Separated water from sedimentation can be taken out from an overflow taking-out port 117 of the thickener 115. The amount of flowing from the sludge collecting case 113 down to the thickener 115 can be regulated by regulation of an overflow regulating valve 118 and regulation of the amount of drawing from the sludge drawing port 116. The separated water from sedimentation of the sludge thickener 115 is returned from the piping 117 via the flow regulating valve 118 to a raw water tank. A check valve 119 is provided on the upstream side of the water spraying pipe 111 to prevent backflow. The arrangement order of a water spraying amount regulating valve 124 and the check valve 119 may be reverse of that of this embodiment.

The tilt angle of the side wall of the sludge collecting case 113 is larger than the repose angle of settled particles. The particles are precipitated into the thickener 115 without being deposited in the sludge collecting case 113. The angle of the thickener 115 is larger than the repose angle of the concentrated particles. The sludge concentrated by gravity can be taken out from the sludge drawing port 116.

The rotating disc type magnetic filter case 103 is stored in a fixed filter case 120. The watertight to the outside is held by a partition wall. The rotating disc type magnetic filter case 103 can be rotated continuously or intermittently by the driving force of the speed-changeable electric motor 109 on the center axis 102. The portion in which the center axis 102 is extended through the filter case 120 has a construction without water leakage by a shaft seal mechanism. The electric motor 109 is arranged away from the superconducting magnet 105. The magnetic filter may be driven via a chain, a belt, or a shaft.

The vacuum insulation case 104 has an injection port 122 for injecting liquid helium via a gate valve 121 and a safety valve 123 of helium gas. When the superconducting magnet 105 is quenched, the helium gas in the vacuum insulation case 104 is discharged through a conduit connected to the safety valve 123 to a safe place.

According to this embodiment, the construction of the magnetic separation unit can be simplified. The filter construction capable of holding a high magnetic field and a high gradient magnetic field can significantly reduce the amount of injected magnetic particles. The volume of the magnetic flocculates which are separated from treated water and flushed out of the magnetic filter is reduced in sludge concentration process. The post-treatment system such as magnetic particles recovering treatment and sludge dehydrating can be smaller. The initial cost and the running cost can be reduced.

In the magnetic separation unit of this embodiment, a water passing pipe 301 passing treated water including magnetic flocs in which contaminants and magnetic particles are flocculated, from the lower side through the air-core part of the superconducting magnet 105 is an enlarged water passing pipe in which its upstream side is smaller and its downstream side is larger. The magnetic flocs can be prevented from being trapped and deposited on the air-core pipe wall. On the upstream side having a high flow velocity, the fluid force acting on the magnetic flocs overcomes the magnetic force. The treated water can pass through the maximum magnetic field of the superconducting magnet 105 without largely curving the trajectory in the pipe wall direction.

A flow rectification unit 311 is arranged in the enlarged portion of the downstream, permitting outflowing to the magnetic filter part arranged in the further downstream in a uniform flow velocity distribution. The magnetic separation unit of such construction can stabilize the magnetic separation performance. The flow velocity of the contracted part of the water passing path has a appropriate range. From the experimental result, the lower limit flow velocity is about 0.2 m/s and the upper limit is about 1.0 m/s in which the shearing force in the fluid is larger with increase in the flow velocity and the magnetic flocs can be destroyed. Most part of the water passing pipe 301 to the magnetic filter part constructed of magnetic thin wires can be constructed of a water channel having a small pipe diameter. The cost of the magnetic separation unit can be reduced.

Figure 3:
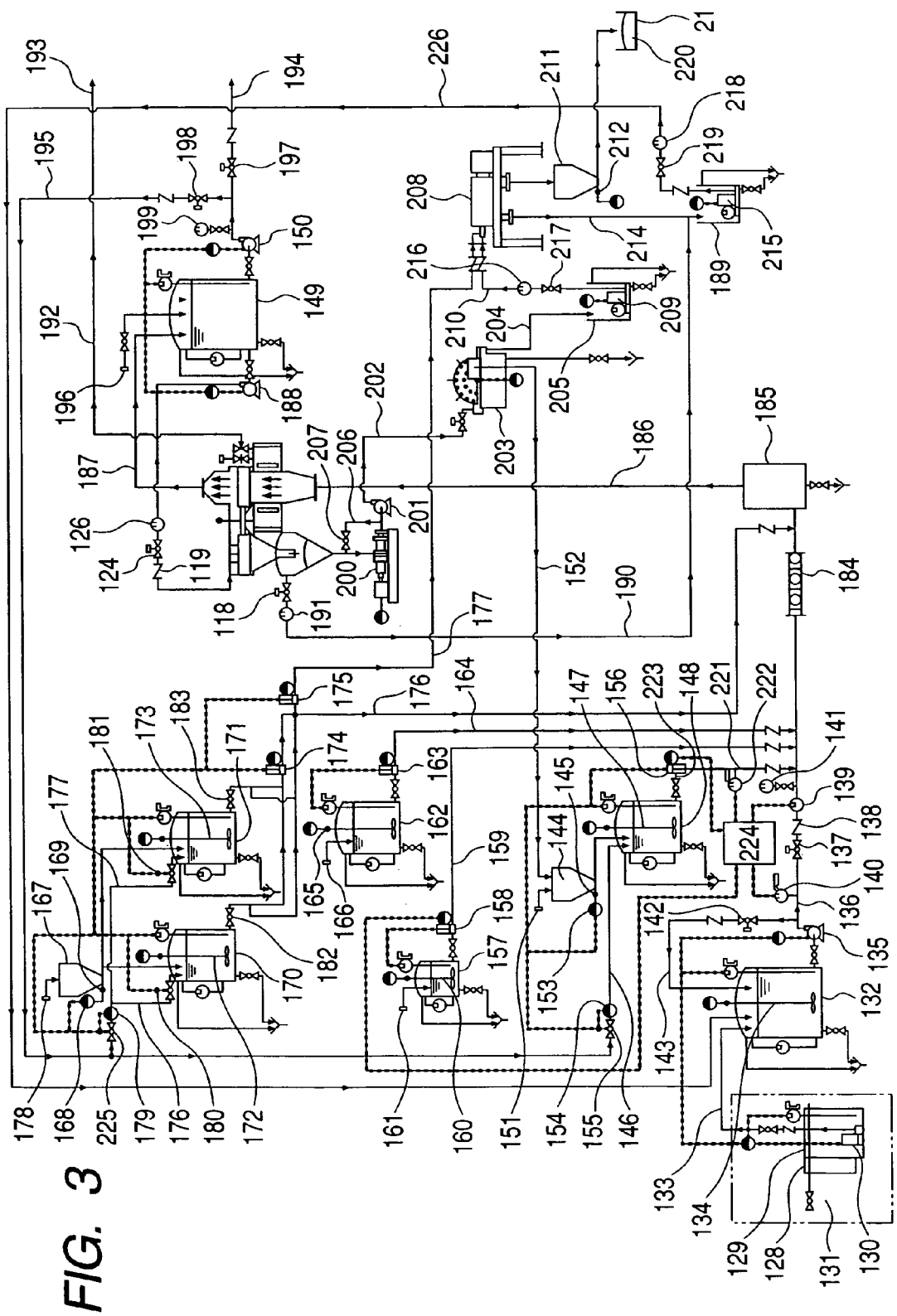
FIG. 3 is a block diagram of a water purification system using the magnetic separation unit of FIG. 1.

A water purification system using such magnetic separation unit will be described using FIG. 3. FIG. 3 is a block diagram of the water purification system using the magnetic separation unit of FIG. 1.

The water purification system including magnetic particles recovering and recycling is broadly divided into a water intake unit, a water conveying unit, an additive injection unit, a floc forming unit, a magnetic separation unit, a purified water discharging unit, a magnetic particles recovering and recycling unit, and a sludge dehydrating unit. Raw water including contaminants such as phosphate and microcystis is taken in from a lake or swamp by the water intake unit to be conveyed to the magnetic separation unit by the water conveying unit. An additive necessary for generating magnetic flocs is injected by the additive injection unit in the water conveying path to the magnetic separation unit. The floc forming unit generates magnetic flocs as flocculates of magnetic particles and contaminants. When the contaminants are dissoluble inorganic phosphate, they chemically react with indissoluble metal salt which is a coagulant agent to flocculates. The magnetic separation unit separates magnetic flocs from treated water including the magnetic flocs and concentrates them. The purified water is discharged by the purified water discharging unit or is recycled as the slurry of the additive. The concentrated magnetic flocs are separated into the magnetic particles and contaminants by the magnetic particles recovering and recycling unit to recycle the magnetic particles. The sludge is dehydrated by the sludge dehydrating unit to be dehydrated sludge.

The water intake unit has a screen 128, a water intake tank 129, and a water intake pump 130. Raw water 131 including contaminants such as phosphate and suspended solids is flowed through the screen 128 down to the water intake tank 129, is taken in by the water intake pump 130 provided in the water intake tank 129, and is conveyed to a raw water tank 132. The screen 128 removes large-size dirt suspended in the raw water to dispose of the removed dirt. The water intake pump 130 is a submerged pump and is controlled in engagement with water level gages respectively provided in the water intake tank 129 and the raw water tank 132. The numeral 133 denotes a water conveying pipe and is connected from the discharge port of the water intake pump 130 to the raw water tank 132. A gate valve and a check valve are connected therebetween.

The water conveying unit has the raw water tank 132, a raw water agitator 134, a water conveying pump 135, and a water conveying pipe 136. The raw water taken in by the water intake unit and treated water such as the separated water from sedimentation of the thickener 115 described in FIG. 1 and separated water of the sludge dehydrating unit are flowed into the raw water tank 132. The raw water agitator 134 can make the concentration of contaminants uniform and prevent the contaminants from being precipitated. The treated water is drawn from the raw water tank 132 by the water conveying pump 135 connected to the raw water tank 132 by a conduit and is conveyed through the water conveying pipe 136 connected to the discharge port of the water conveying pump 135, the additive injection unit, and the floc forming unit to the magnetic separation unit. The water conveying pipe 136 is connected to a flow regulating valve 137, a check valve 138, a flow meter 139, a turbidimeter 140, and a pressure gage 141. The water conveying pipe 136 is branched to return part of the treated water to the raw water tank 132 for performing regulation of the amount of conveyed water and agitation in the raw water tank 132. The treated water regulated by a regulating valve 142 is returned through a water returning pipe 143 to the raw water tank 132. A check valve is provided in the water returning pipe 143 to prevent backflow. The water conveying pump 135 is engaged with the water level gage provided in the raw water tank 132 and is stopped when the water level of the raw water tank 132 is abnormally lowered, thereby preventing an accident such as failure of the water conveying pump 135.

The additive injection unit has magnetic particles injection means, inorganic coagulant agent injection means, pH adjusting agent injection unit, organic polymer coagulant agent injection means.

The magnetic particles injection means has a magnetic particles hopper 144, a magnetic particles feeder 145, a slurry injection pipe 146, and a magnetic particles slurry agitator 147. Magnetic particles are stored in the magnetic particles hopper 144 and are fed from the magnetic particles hopper 144 through the magnetic particles feeder 145 provided in the lower portion of the magnetic particles hopper 144 into a magnetic particles slurry tank 148. Slurry is injected by a purified water pump 150 from a purified water tank 149 through the slurry injection pipe 146 into the magnetic particles slurry tank 148 and is mixed with the magnetic particles by the magnetic particles slurry agitator 147 provided in the magnetic particles slurry tank 148 for supplying magnetic particles slurry. The magnetic particles hopper 144 is connected to a magnetic particles feeding port 151 and recovered magnetic particles feeding means 152 for supplying magnetic particles. The magnetic particles feeder 145 is engaged with the water level gage provided in the magnetic particles slurry tank 148 and a feeding amount integrating meter 153. The operation is started when the water surface level of the magnetic particles slurry tank 148 is lowered to a predetermined position. The operation is stopped when obtaining a predetermined amount integrated by the feeding amount integrating meter 153. The slurry injection pipe 146 is connected to an integrating flow meter 145 and an electromagnetic valve 155. The electromagnetic valve 155 is engaged with the water level gage of the magnetic particles slurry tank 148 and the integrating flow meter 154. It is opened to start water injection when the water surface level of the magnetic particles slurry tank 148 is lowered to a predetermined position. It is closed to stop water injection when obtaining a predetermined flow rate integrated by the integrating flow meter 154. A magnetic particles slurry injection pump 156 is engaged with the water level gage of the magnetic particles slurry tank 148. It is stopped when the water surface level of the magnetic particles slurry tank 148 is abnormally lowered, thereby preventing an accident such as failure of the magnetic particles slurry injection pump 156. The magnetic particles hopper 144 is provided with an arch breaker, not shown, so that dried air is sent thereto. A screw feeder or a table feeder is used as the magnetic particles feeder 145.

The inorganic coagulant agent injection means is means for injecting an inorganic coagulant agent reserved in an inorganic coagulant agent reservation tank 157 into the water conveying pipe 136 by an inorganic coagulant agent injection pump 158 and an inorganic coagulant agent injection pipe 159. The inorganic coagulant agent reservation tank 157 is provided with an inorganic coagulant agent agitator 160 for making the concentration of an inorganic coagulant agent in the inorganic coagulant agent reserving tank 157 uniform and preventing precipitation. The inorganic coagulant agent injection pump 158 is a positive-displacement metering pump and is engaged with the water level gage provided in the inorganic coagulant agent reserving tank 157. It is stopped when the water surface level of the inorganic coagulant agent reserving tank 157 is abnormally lowered, thereby preventing an accident such as failure of the inorganic coagulant agent injection pump 157. An inorganic coagulant agent injection amount control function is added to the magnetic particles injection amount control means to be connected to the inorganic coagulant agent injection pump 158, thereby controlling the inorganic coagulant agent injection amount corresponding to the amount of contaminants in the treated water. An inorganic coagulant agent of aluminum sulfate or iron is used as the inorganic coagulant agent. It is supplied from a supply port 161 to the inorganic coagulant agent reserving tank 157. The inorganic coagulant agent injection pipe 159 is connected via the check valve to the water conveying pipe 136.

The pH adjusting agent injection means is means for injecting a pH adjusting agent reserved in a pH adjusting agent reserving tank 162 into the water conveying pipe 136 by a pH adjusting agent injection pump 163 and a pH adjusting agent injection pipe 164 to adjust the pH of treated water to a value suitable for flocculation. The pH adjusting agent reserving tank 162 is provided with a pH adjusting agent agitator 165 for making the concentration of the pH adjusting agent in the pH adjusting agent reserving tank 162 uniform and preventing precipitation. The pH adjusting agent injection pump 163 is a positive-displacement metering pump and is engaged with the water level gage provided in the pH adjusting agent reserving tank 162. It is stopped when the water surface level of the pH adjusting agent reserving tank 162 is abnormally lowered, thereby preventing an accident such as failure of the pH adjusting agent injection pump 163. The pH meter and the pH adjusting meter are used to control the amount of discharge of the pH adjusting agent injection pump to permit pH control of treated water. A sodium hydroxide solution or a calcium hydroxide solution is used as the pH adjusting agent. It is supplied from a supply port 166 to the pH adjusting agent reserving tank 162. The pH adjusting agent injection pipe 164 is connected via the check valve to the water conveying pipe 136.

The organic polymer coagulant agent injection means has a organic polymer coagulant agent hopper 167, a feeding amount integrating meter 168, a organic polymer coagulant agent feeder 169, organic polymer coagulant agent dissolving tanks 170 and 171, organic polymer coagulant agent agitators 172 and 173, and organic polymer coagulant agent injection pumps 174 and 175.

The organic polymer coagulant agent is stored in the organic polymer coagulant agent hopper 167 and is fed from the organic polymer coagulant agent hopper 167 through the organic polymer coagulant agent feeder 169 provided in the lower portion of the organic polymer coagulant agent hopper 167 into the organic polymer coagulant agent dissolving tank 170 or 171. Slurry is injected by the purified water tank 150 from the purified water tank 149 through a slurry injection pipe 176 or 177 into the organic polymer coagulant agent dissolving tank 170 or 171. The organic polymer coagulant agent dissolving tank 170 or 171 dissolves the organic polymer coagulant agent into the slurry by the organic polymer coagulant agent agitator 172 or 173. It takes about one hour to dissolve the organic polymer coagulant agent. The organic polymer coagulant agent dissolving tanks 170 and 171 perform dissolving and reservation alternately. The volumes of the tanks are above volumes used for one hour. It is injected from the organic polymer coagulant agent dissolving tank on the reserved side into the water conveying pipe 136 or the sludge dehydrating unit by the organic polymer coagulant agent injection pumps 174 and 175 and the organic polymer coagulant agent injection pipes 176 and 177. The organic polymer coagulant agent is supplied from a organic polymer coagulant agent feeding port 178 to the organic polymer coagulant agent hopper 167.

The organic polymer coagulant agent feeder 169 is engaged with the water level gage provided in the organic polymer coagulant agent dissolving tank 170 or 171 and the feeding amount integrating meter 168. When the water surface level of the organic polymer coagulant agent dissolving tank 170 or 171 is lowered to a predetermined position, feeding is started. When obtaining a predetermined amount integrated by the feeding amount integrating meter 168, feeding is stopped. The organic polymer coagulant agent feeder 169 has a mechanism switching the fed side and can switch the fed side to the organic polymer coagulant agent dissolving tank 170 or 171.

The organic polymer coagulant agent hopper 167 is provided with an arch breaker, not shown, so that dried air is sent thereto. A screw feeder or a table feeder is used as the organic polymer coagulant agent hopper 167. The slurry injection pipe is connected to an integrating flow meter 179 and an electromagnetic valve 225. The electromagnetic valve 225 is engaged with the water level gage of the organic polymer coagulant agent dissolving tank 170 or 171 and the integrating flow meter 179. When the water surface level of the organic polymer coagulant agent dissolving tank 170 or 171 is lowered to a predetermined position, the electromagnetic valve 225 is opened to start water injection. When obtaining a predetermined flow rate integrated by the integrating flow meter 179, the electromagnetic valve 225 is closed to stop water injection. The slurry injection pipe is branched into the slurry injection pipes 176 and 177 to be connected via an electromagnetic valve 180 or 181 opened and closed in engagement with the water level gage of the organic polymer coagulant agent dissolving tank 170 or 171 to the organic polymer coagulant agent dissolving tank 170 or 171. When the water surface level is lowered to a predetermined low water level position, the electromagnetic valve 180 or 181 is opened to inject the slurry. When it rises to a predetermined high water level position, the electromagnetic valve 180 or 181 is closed to stop injection of the slurry.

The organic polymer coagulant agent injection pumps 174 and 175 are positive-displacement metering pumps and are engaged with the water level gage of the organic polymer coagulant agent dissolving tank 170 or 171. They are stopped when the water surface level of the organic polymer coagulant agent dissolving tank 170 or 171 is abnormally lowered, thereby preventing an accident such as failure of the organic polymer coagulant agent injection pump 174 or 175. The respective suction ports of the organic polymer coagulant agent injection pumps 174 and 175 are connected in parallel with the organic polymer coagulant agent dissolving tanks 170 and 171. Valves 182 and 183 are switched to select the organic polymer coagulant agent dissolving tank in which reservation is performed to draw the organic polymer coagulant agent. An electromagnetic valve or an electrically operated valve is used as the valves 182 and 183 which are engaged with the water level gages of the organic polymer coagulant agent dissolving tanks 170 and 171 to permit open/close control. A check valve is connected in the pipeline of the organic polymer coagulant agent injection pipes 176 and 177 to prevent backflow.

The floc forming unit is constructed by a flash mixer 184 and a flocculator 185 connected to the water conveying pipe 136. The conduit connected to the flash mixer 184 and the flocculator 185 is connected to the organic polymer coagulant agent injection pipe 176 to inject the organic polymer coagulant agent. Treated water into which an additive is injected by the additive injection unit is conveyed through the water conveying pipe 136 to the flash mixer. The additive and contaminants (for instance, suspended solids, phosphates, and bacteria such as colon bacilli) are uniformly dispersed into the treated water to generate micro floc. The organic polymer coagulant agent is injected into the treated water to form the magnetic flocs by the flocculator. A static mixer without a movable part is used as the flash mixer. A sealed agitation tank having a predetermined volume and an agitator are used as the flocculator. A static mixer or an agitator of a pipe line system can also be used for both.

Figure 2:
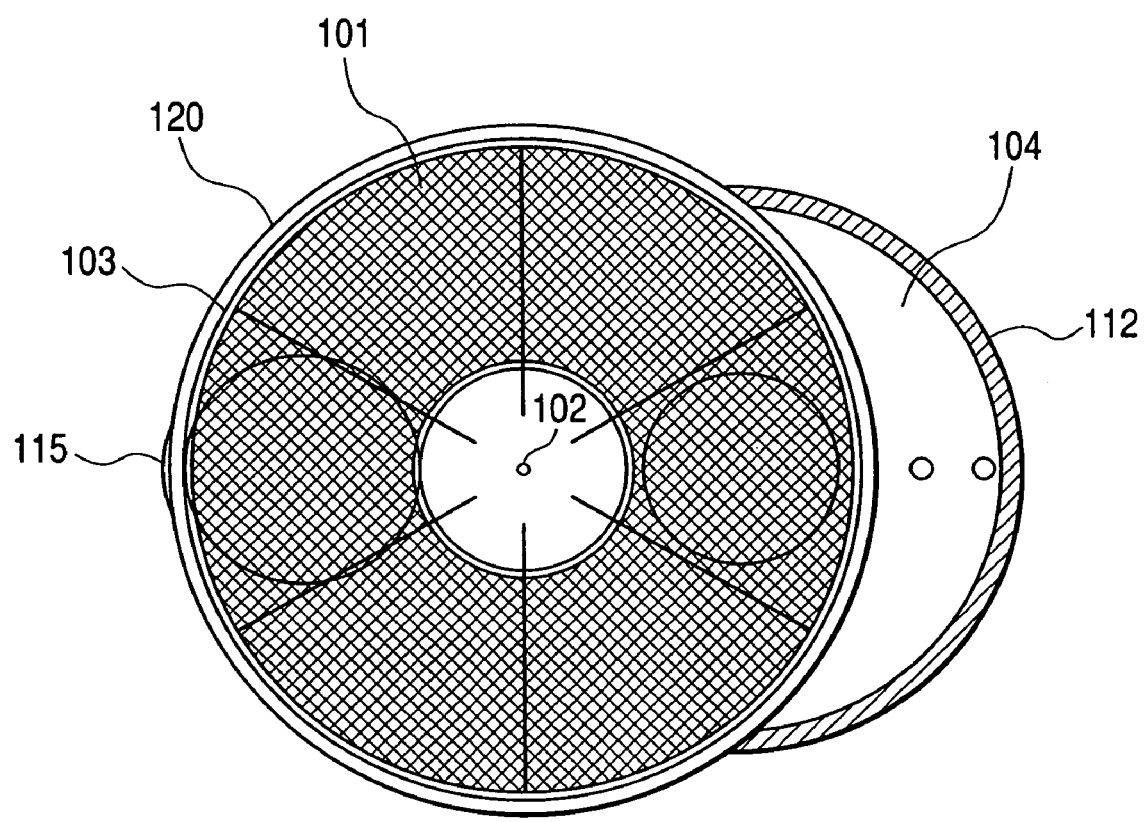
FIG. 2 is a cross-sectional view taken along line A-A of FIG. 1.

The magnetic separation unit is the magnetic separation unit described in FIGS. 1 and 2. Treated water including the magnetic flocs is conveyed from the flocculator 185 through a conduit 186 connected to the water passing pipe 301 of the magnetic separation part to the magnetic separation unit to magnetically separate the magnetic flocs. The purified water is conveyed through a conduit 187 to the purified water tank 149. The flushing water used in the magnetic separation unit is conveyed from a pressurizing pump 188 to the water spraying pipe 111. The flushing water piping is provided with the check valve 119, the flow regulating valve 124, and the flow meter 126. Separated water from sedimentation taken out from the thickener 115 of the magnetic separation unit is conveyed from the separated water from sedimentation taking-out port of the thickener through a conduit 190 connected to the separated water tank 189 to a separated water tank 189. The separated water from sedimentation taking-out port side of the conduit 190 is provided with a flow meter 191 and the regulating valve 118 to permit regulation of the amount of the taken-out separated water from sedimentation. The sludge of which volume has been reduced by being concentrated by the thickener 115 is conveyed to the magnetic particles recovering and recycling unit. The helium gas from the safety valve of the vacuum insulation case of the magnetic separation unit is discharged through a conduit 192 connected to the safety valve from a safe discharge port 193 into the air.

The purified water obtained by the magnetic separation unit is mainly discharged to a lake or swamp. The purified water is used to flush and recondition the matrixes 101 fitted in the rotating disc type magnetic filter case 103 and the slurry of magnetic particles and coagulant agent. Part of the purified water is used as the slurry. It is once reserved in the purified water tank 149 to be discharged by the purified water pump 150 and a discharging pipe 194. The discharging pipe 194 is branched into a slurry transfer pipe 195 in the pipeline. Some of the purified water is used as the slurry of the additive injection unit. When the purified water tank 149 is empty before starting the purifying operation and the amount of water is small, a necessary amount of tap water is supplied to the purified water tank 149 to secure the flushing water and the slurry of the rotating disc type magnetic filter case 103 at the start of the operation. The tap water is connected to a tap water connection port 196 for injection via the valve into the purified water tank 149.

The discharging pipe 194 and the slurry transfer pipe 195 are connected to regulating valves 197 and 198. The purified water distributing pressure from the discharging pipe 194 to the slurry transfer pipe 195 can be regulated. The check valve prevents backflow. The pipeline between the purified water pump 150 and the branch point of the slurry transfer pipe 195 is provided a pressure gage 199 to monitor the discharging pressure. The purified water pump 150 is engaged with the water level gage provided in the purified water tank 149 and is stopped when the water surface level of the purified water tank 149 is abnormally lowered, thereby preventing an accident such as failure of the purified water pump 150. When the purified water discharged side is lower than the purified water tank 149 and the purified water pump 150 is not necessary for discharging, the purified water pump 150 is used only for conveying the slurry. The overflow from the purified water tank 149 is flowed down to the discharged side by the conduit to make the purified water pump 150 smaller. When the purified water pump 150 is not necessary for conveying the slurry, the purified water pump 150 is not necessary to simplify the unit. The flushing water of the rotating disc type magnetic filter case 103 is also conveyed from the purified water tank by the flushing water pressurizing pump. The flushing flow meter 126, the flow regulating valve 124, and the check valve 119 are arranged midway the flushing water piping to prevent regulation of the flushing flow rate and backflow from the magnetic separation body.

In the magnetic particles recovering and recycling unit, the sludge of the magnetic flocs drawn from the lower part of the thickener of the magnetic separation unit is pulverized by a pulverizer 200 to be decomposed into contaminants and magnetic particles with high purity and is then conveyed to a magnetic separator 203 by a sludge pump 201 and a sludge transfer pipe 202. The sludge which has passed through the magnetic separator 203 is flowed through a conduit 204 down to a sludge tank 205. The magnetic particles recovered by the magnetic separator 203 are supplied through the recovered magnetic particles feeding means 152 to the magnetic particles hopper 144 for recycling. A homomixer is used as the pulverizer 200 to continuously circulate some of the sludge by a conduit 206 bypassing the entry and exit and a valve 207 in the pipeline thereof to enhance the decomposition purity. In this example, the sludge pump 201 is provided in the later stage of the pulverizer 200. The pulverizer 201 may be provided in the later stage of the sludge pump 201.

The amount of sludge conveyed from the thickener 115 via the pulverizer 200 and the sludge pump 201 to the magnetic separator 203 is regulated by the valve provided in the sludge transfer pipe 202. The magnetic separator 203 has a rotating disc driven by the electric motor in which permanent magnet cells are embedded, a separating tank accommodating pulverized sludge, and a scraper scraping magnetic particles attracted by the permanent magnet of the disc. The rotating disc revolves and part of the disc is immersed in sludge in the separating tank. The magnetic particles are attracted by the permanent magnet of the rotating disc in the process where the sludge in the separating tank is flowed toward the overflow side on the opposite side to be overflowed. The attracted magnetic particles are moved into the air with the rotation of the rotating disc to be scraped by the scraper and collected. An agitating vane is provided in the outer circumference of the rotating disc and on the inner wall of the separating tank. The rotating disc is rotated to agitate the sludge in the separating tank to prevent the magnetic particles from being precipitated. A screw feeder or a belt conveyer can be used as the collected magnetic particles feeding means 152. The magnetic separator 203 is arranged directly above the magnetic particles feeding port of the magnetic particles hopper 144. The collected magnetic particles are fed into the magnetic particles hopper 144 by gravity falling. The collected magnetic particles feeding means 152 is unnecessary to simplify the unit. The magnetic separator 203 is arranged directly above the magnetic particles slurry tank 148 to feed the collected magnetic particles into the magnetic particles slurry tank 148 by gravity falling. The collected magnetic particles feeding means 152 can be omitted to simplify the unit.

The sludge dehydrating unit is means for dehydrating sludge by a sludge dehydrater 208 to reduce the volume thereof and facilitating sludge conveying. The sludge is fed from the sludge tank 205 via a sludge feed pump 209 and a feed pipe 210 to the sludge dehydrater 208. The sludge dehydrater 208 is connected to a organic polymer coagulant agent injection pipe 177 from the additive injection unit to inject the organic polymer coagulant agent. The dehydrated sludge is dropped from the sludge discharge port to a shooter 211 to be transferred to a sludge collecting case 213 by a sludge feeder 212. The separated water passes through a conduit 214 to be flowed down from the separated water discharge port to the separated water tank 189 and is conveyed to the raw water tank 132 by a separated water pump 215 and the conduit 189 with the separated water from sedimentation of the thickener of the magnetic separation unit. The sludge feed pump 209 is a submerged slurry pump with a float switch and is stopped when the sludge water surface level of the sludge tank 205 is abnormally lowered, thereby preventing an accident such as failure of the sludge feed pump 209. The separated water pump 215 is a submerged pump with a float switch and is stopped when the water level of the separated water tank 209 is abnormally lowered, thereby preventing an accident such as failure of the purified water pump 150. A slurry flow meter 216 and a flow regulating valve 217 are provided in the pipeline of the feed pipe 210. A flow meter 218, a valve 219, and a check valve are connected in the pipeline of the conduit 216. Dehydrated sludge 220 reserved in the sludge collecting case 213 is conveyed to and disposed of in a waste disposal center or can be recycled as raw material of compost. In particular, the iron content in sludge is high in a system not collecting and recycling magnetic iron particles. It can be recycled as raw material of cement necessary for iron.

Figure 4:
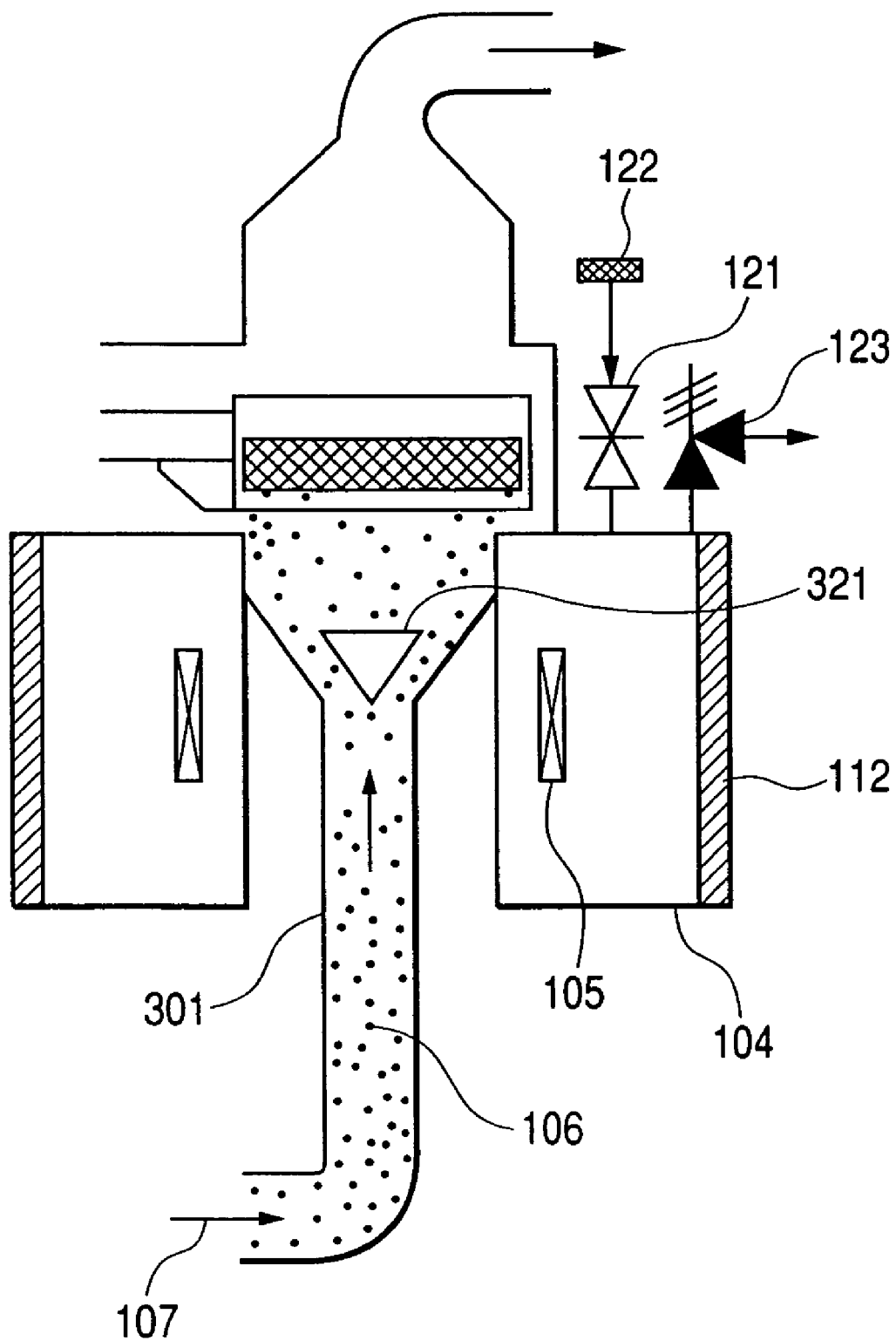
FIG. 4 is a block diagram showing a magnetic separation unit of a second embodiment of the present invention.

A second embodiment of the present invention will be described using FIG. 4. FIG. 4 is a block diagram of a magnetic separation unit of the second embodiment of the present invention. The second embodiment is different from the first embodiment as described below and is basically the same as the first embodiment in other points.

In the second embodiment, the inner water passing pipe of the air-core solenoid superconducting magnet is different. A conical baffle (cone) 321 is provided along the center axis in the portion whose cross-sectional area is changed from the small pipe to the enlarged portion. The baffle 321 constructs the flow rectification unit. The baffle 321 equally distributes and radiates the flow of the outlet of the small pipe around the baffle 321 to be more uniform. The flow is flowed out to the matrixes 101 of the rotating disc type magnetic filter case 103 to magnetically separate the magnetic flocs 106 therein. In general, the conical angle of the baffle 321 is preferably a large angle of about 80 to 120 degrees. The size in the up-and-down direction of the air-core magnet (the vacuum case 104) is about the same as the air-core diameter. The flow must be enlarged and uniform in a very short distance. The cone is used to increase the flow velocity in the inlet to the air-core magnet to prevent trapping of the magnetic flocs 106 in the magnet pipe wall to enlarge and make the flow in the latter half uniform. The magnetic separation performance can be prevented from being lowered. In particular, the baffle 321 is effective for solving clogging in the flow rectification unit.

What is claimed is:

1. A magnetic separation unit comprising:
   an air-core solenoid type magnet having an air core at its center portion;
   a water passing pipe guiding, from a lower side, treated water including magnetic flocs in which contaminants and magnetic particles are flocculated and passing through the air core of said air-core solenoid type magnet;
   a rotating disc type magnetic filter attracting the magnetic flocs in the treated water supplied from said water passing pipe, said rotating disc type magnetic filter provided above said air-core solenoid type magnet; and
   flushing means for flushing the magnetic flocs attracted by said rotating disc type magnetic filter,
   wherein said water passing pipe has a small-diameter pipe section positioned in the air core of said air-core solenoid type magnet that guides the treated water from the lower side; and
   an enlarged pipe section positioned in the air core of said air-core solenoid type magnet that is gradually enlarged from said small-diameter pipe section toward a water passing part of said rotating disc type magnetic filter.

2. The magnetic separation unit according to claim 1, wherein the enlarged pipe section of said water passing pipe is enlarged from an upper portion in the air core of said air-core solenoid type magnet.

3. The magnetic separation unit according to claim 1, wherein said air-core solenoid type magnet is constructed of a superconducting magnet provided in a vacuum insulation case.

4. The magnetic separation unit according to claim 1, wherein a flow rectification unit is arranged in the enlarged pipe section of said water passing pipe, said flow rectification unit being operatively configured to provide a uniform flow velocity distribution of treated water that flows from the enlarged pipe section downstream to the rotating disc type magnetic filter.

5. The magnetic separation unit according to claim 4, wherein a conical baffle is provided in a region of the water passing pipe where the water passing pipe is gradually enlarged from said small-diameter pipe section to said enlarged pipe section, said conical baffle comprising a cone that is enlarged in the direction of the enlarged pipe section.

6. The magnetic separation unit according to claim 1, wherein a flow velocity of said air-core solenoid type magnet of the small-diameter pipe section of said water passing pipe is set in a range of 0.2 to 1.0m/s.

7. The magnetic separation unit according to claim 4, wherein a flow velocity of the water passing part of said rotating disc type magnetic filter water-passed from the enlarged pipe section of said water passing pipe is set to about 0.1 m/s.

8. A water purification system which has:
   a water intake unit taking in raw water including contaminate components;
   an additive injection unit injecting a coagulant agent and magnetic particles into the raw water taken in by said water intake unit;
   a floc forming unit forming magnetic flocs in which the contaminants and the magnetic particles are flocculated by the injection of said coagulant agent and the magnetic particles;
   a magnetic separation unit separating said magnetic flocs from the treated water including said magnetic flocs flocculated by said floc forming unit; and
   a purified water discharging unit discharging as purified water the treated water from which said magnetic flocs are removed, wherein said magnetic separation unit has:
   an air-core solenoid type magnet having an air core at its center portion;
   a water passing pipe guiding, from a lower side, treated water including the magnetic flocs flocculated by said floc forming unit and passing through the air core of said air-core solenoid type magnet;
   a rotating disc type magnetic filter provided above said air-core solenoid type magnet and fitted with matrixes for attracting the magnetic flocs in the treated water supplied from said water passing pipe; and
   flushing means for flushing the matrixes to which said magnetic flocs are attracted;
   wherein said water passing pipe has a small diameter pipe section positioned in the air core of said air-core solenoid type magnet and an enlarged pipe section positioned in the air core of said air-core solenoid type magnet that is gradually enlarged from said small-diameter pipe section to a water passing part side of said rotating disc type magnetic filter.

9. The water purification system according to claim 8, wherein a conical baffle is provided in a region of the water passing pipe where the water passing pipe is gradually enlarged from said small-diameter pipe section to said enlarged pipe section, said conical baffle comprising a cone that is enlarged in the direction of the enlarged pipe section.

10. The water purification system according to claim 8, wherein a flow velocity of the small-diameter pipe section of said water passing pipe in said air-core solenoid type magnet is set in a range of 0.2 to 1.0 m/s, and a flow velocity of the water passing part of said rotating disc type magnetic filter water-passed from the enlarged pipe section of said water passing pipe is set to about 0.1 m/s.

* * * * *